INVENTOR.
EDWIN K. SHENK
BY Weingarten, Orenbuch & Lahive
ATTORNEYS

| | | COL. A | COL. B | COL. C |
|---|---|---|---|---|
| | CODE | 01 | 10 | 00 |
| ROW a | 11 | 1 | 2 | 3 |
| ROW b | 01 | 4 | 5 | 6 |
| ROW c | 10 | 7 | 8 | 9 |
| ROW d | 00 | | 0 | |

| BUTTON | BINARY CODE | NO. OF PULSES |
|---|---|---|
| 1 | 0111 | 7 |
| 2 | 1011 | 11 |
| 3 | 0011 | 3 |
| 4 | 0101 | 5 |
| 5 | 1001 | 9 |
| 6 | 0001 | 1 |
| 7 | 0110 | 6 |
| 8 | 1010 | 10 |
| 9 | 0010 | 2 |
| 0 | 1000 | 8 |

INVENTOR
EDWIN K. SHENK
BY Weingarten, Orenbuch & Lahive
ATTORNEYS

INVENTOR
EDWIN K. SHENK
BY Weingarten, Orenbuch & Lahive
ATTORNEYS

INVENTOR.
EDWIN K. SHENK
BY Weingarten, Orenbuch & Lahive
ATTORNEYS

INVENTOR.
EDWIN K. SHENK
BY Weingarten, Orenbuch & Lahive
ATTORNEYS

INVENTOR.
EDWIN K. SHENK
BY Weingarten, Orenbuch & Lahive
ATTORNEYS

INVENTOR.
EDWIN K. SHENK
BY Weingarten, Orenbuch & Lahive
ATTORNEYS

United States Patent Office 3,430,004

Patented Feb. 25, 1969

3,430,004

TONE SIGNAL REPERTORY DIALER

Edwin K. Shenk, Littleton, Mass., assignor, by mesne assignments, to DASA Corporation, Andover, Mass., a corporation of Massachusetts Filed Dec. 28, 1965, Ser. No. 517,056

U.S. Cl. 179—90 10 Claims

Int. Cl. H04m *1/50*

ABSTRACT OF THE DISCLOSURE

A repertory dialer recording pulses on a magnetic medium that are converted into tone bursts used in a multi-frequency system. The signal output of the keyboard is converted by a memory device into binary code signals. Every key on the board is associated with a unique four bit code. Each key on the board is also represented by a unique series of pulses. The pulses recorded on the tape representing a pressed key are generated by a pulse generator that has its generating time span controlled by a feedback system which uses a binary code comparator. The time span determines the number of pulses recorded which in turn determine, by way of a pulse to binary code conversion, the multi-frequency tone sent out over the telephone line.

This invention relates to telephone calling apparatus and particularly pertains to repertory dialers.

A repertory dialer is a device employing a storage medium on which is recorded signal information corresponding to frequently called telephone numbers. The signal information is recorded together with a visual designation of the subscriber. When a telephone number is to be called, the visual designation of the subscriber is selected by the user and a button is depressed, whereupon the repertory dialer automatically transmits the proper signalling information to obtain a connection with the selected telephone station.

The recording medium commonly employed in repertory dialers is of the magnetic type; that is, the information is recorded in the form of magnetic signals upon a medium that is characterized by its ability to be magnetized and to retain its magnetized state. The recording medium, usually, is either a magnetic tape or a magnetic drum which is arranged so that a magnetic transducer can be positioned by the user of the repertory dialer to read out the information corresponding to a selected subscriber's telephone number. To initially record information on the storage medium, the user can either cause the information to be magnetically recorded at the time that he places a call to the selected subscriber in the normal manner, or the information can be recorded on the magnetic medium without transmitting the signals to the central office by first placing the apparatus in a condition prohibiting outgoing calls and then placing the call in the normal manner. Information recorded in the repertory dialer can be changed simply by magnetically writing new information over the previously recorded information.

The telephone signals generated by the conventional rotary dial telephone are trains of direct current pulses. The conventional repertory dialer, consequently, operates by duplicating the direct current pulse trains. In recent years, the emphasis has been upon telephone systems of the type using alternating current signals and the term "touch-tone dialing" has come into use in connection with that type of system because a tone signal is generated by depressing a button upon the telephone.

Alternating current signalling operates by simultaneously transmitting a short burst of two selected frequencies, viz., a tone, to indicate a digit in contrast to the train of direct current pulses transmitted by the conventional dial telephone. The time required to transmit all the pulses from the conventional dial telephone to identify a called station is materially reduced by utilizing alternating current signalling. Further, alternating current signalling facilitates direct long distance dialing because the tones are in the voice range and can be transmitted from one terminal of a transmission channel to the other terminal just as voice signals are transmitted. Because each digit in the alternating current signalling system is represented by a different tone, the system is sometimes referred to as a multi-frequency signalling system.

Efforts have been made to develop a repertory dialer capable of being used in multi-frequency signalling systems. U.S. Patent No. 3,128,351 to Hohmann et al., for example, discloses a repertory dialer in which the alternating current signals are directly recorded upon a magnetic drum at the requisite frequencies and, when a telephone number is to be called, the recorded signals are read by a transducer to generate the proper tones. In the Hohmann et al. system, it is necessary to insure that the relative movement between the transducer and the magnetic recording medium is essentially the same on playback as it was when the signals were recorded. Where the relative motion between the transducer and the recording medium on playback differs from the motion used during recording, the signals read by the transducer have a different frequency than the signals had when they were recorded. That shift in frequency results in an improper tone being tranmitted into the telephone system. The problem of preventing the frequency shift is greatly magnified when the recording or the reading of the signals occurs during a time interval in which there is intermittent motion between the transducer and the storage medium. That is, the problem is less acute where there is relative motion between the transducer and storage medium during an extensive period of time because one element need not be brought up to speed relative to the other element. The storage medium is not, however, efficiently utilized because the relative motion is maintained even during the time between signals. For efficient utilization of the storage medium it is desirable to discontinue the relative movement when no information is being recorded on the storage medium. With intermittent relative movement, recorded information can be more densely packed into the storage medium.

The primary objective of this invention is to provide a repertory dialer, for use in a multi-frequency signalling system, which employs magnetic recording in a manner in which the relative speed between the magnetic storage medium and the transducer is not critical.

The invention resides in a repertory dialer arranged to record pulses upon a magnetic medium and to convert the pulses into tone signals. A keyboard is provided in the apparatus, having keys corresponding to the tone signals to be generated. A transducer is provided which can be aligned with a selected track on the magnetic medium. The transducer is employed for both recording and reading, and when used for recording, that transducer's input is coupled to a pulse generator. The repertory dialer has apparatus which, in response to signals from the keyboard, produces a time gate during which signals from the pulse generator are transmitted to the transducer and are recorded upon the magnetic medium which is in motion relative to the transducer. The time gate produced by the actuation of a key of the keyboard has a duration that is different from the duration of the time gate produced by other tone keys in the keyboard. That is, each tone is associated with a time gate of fixed duration. The duration of the time gate determines the number of pulses recorded upon the magnetic medium. The number of pulses, in turn, determines the two frequencies that are generated by a dial frequency tone generator and constitute the tone emitted to the telephone system. Each time a key of the keyboard is actuated, the repertory dialer completes one cycle of operation, at the termination of which the relative motion between the transducer and the recording medium ceases. The next actuation of a key starts another cycle, causing the relative motion to again occur. There is, therefore, intermittent motion between the transducer and the magnetic medium during signal recordation.

In the embodiment of the invention described herein, a memory device is employed to convert signals from the keyboard into binary coded signals signifying a predetermined number of pulses. Actuation of the keyboard causes the pulse generator to operate and that generator commences to emit pulses to a code generator. The coded output of the code generator is compared with coded signals from the memory device and when a match occurs, the pulse generator is disabled and ceases to emit pulses. Each successive pulse from the pulse generator causes a change in the coded output of the code generator. For each different code emitted by the code generator there exists a different tone. The number of pulses recorded on the magnetic medium at the time the pulse generator is disabled, therefore, determines the tone that is generated by a tone generator.

The arrangement, construction, and manner of operation of the invention are detailed in the following exposition and an understanding of the invention can be obtained from a consideration of the exposition when employed in conjunction with the accompanying drawings in which.

Figures 3, 4, 6:
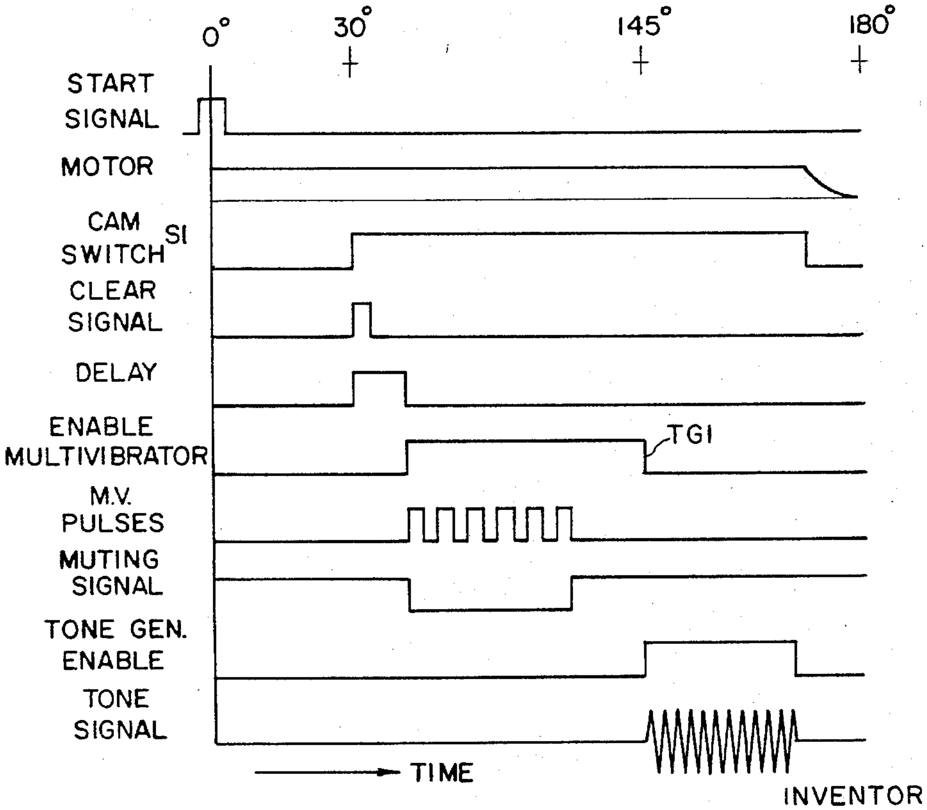
FIG. 3 shows the row and column key arrangement used in the keyboard.
Figure 5:
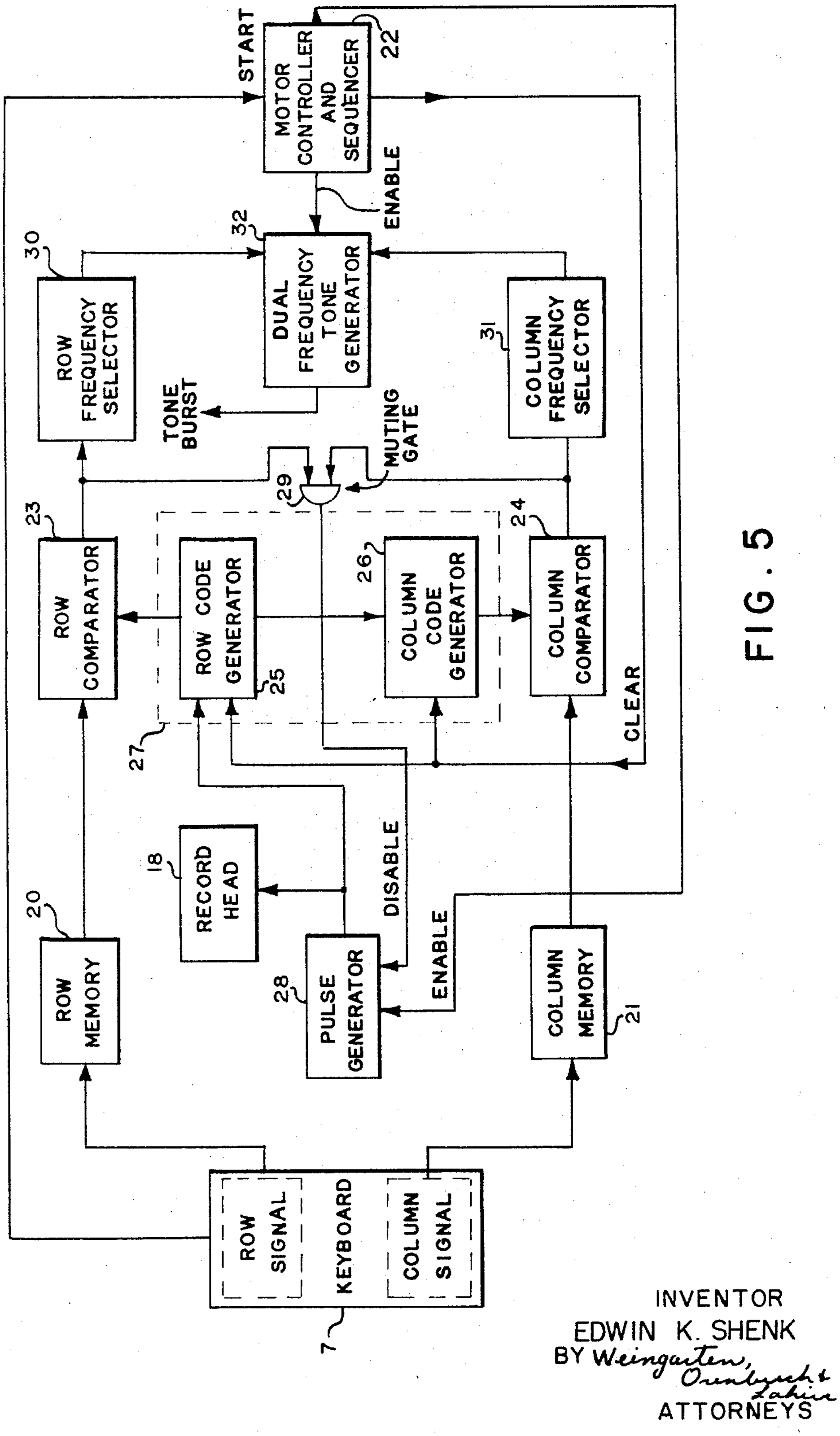
Figure 7:
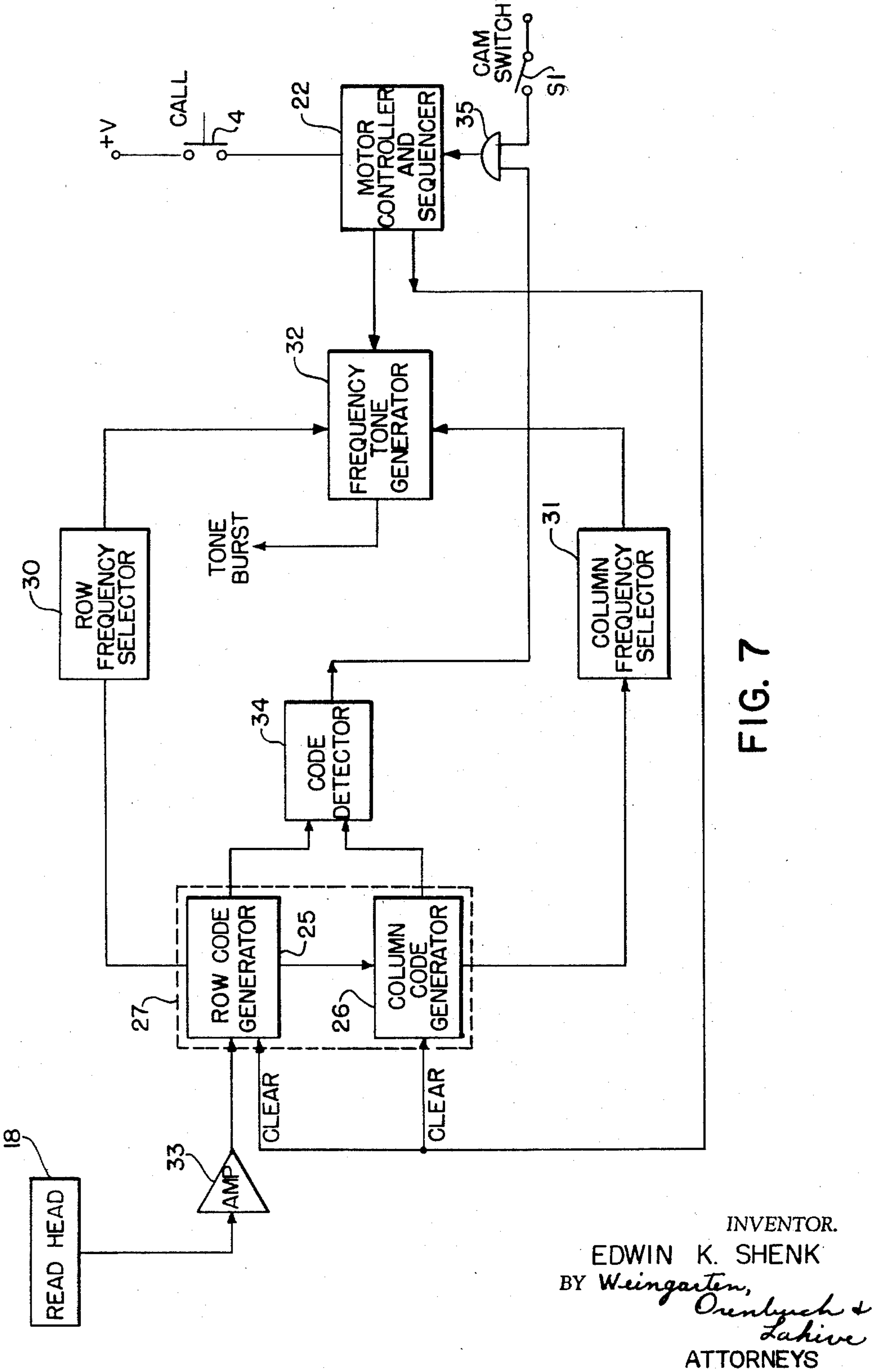
Figure 8:
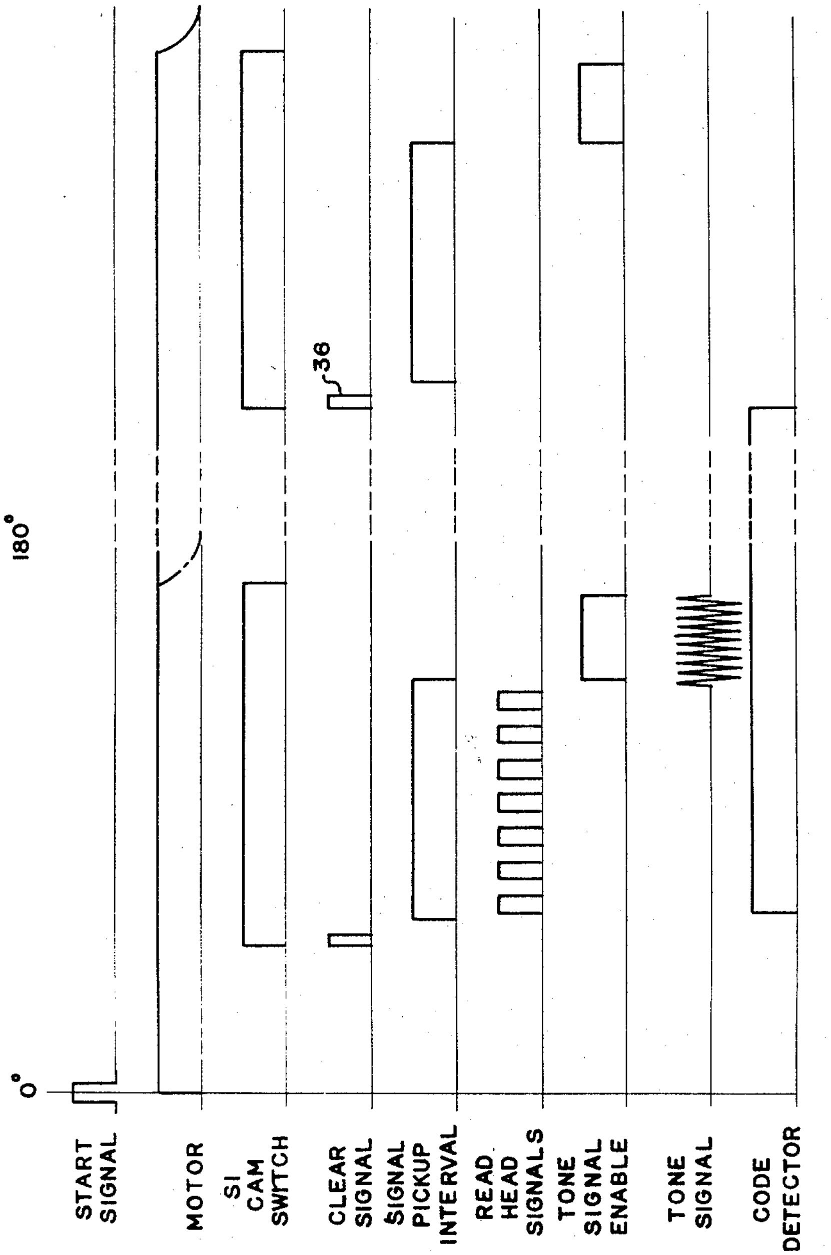
Figure 9:
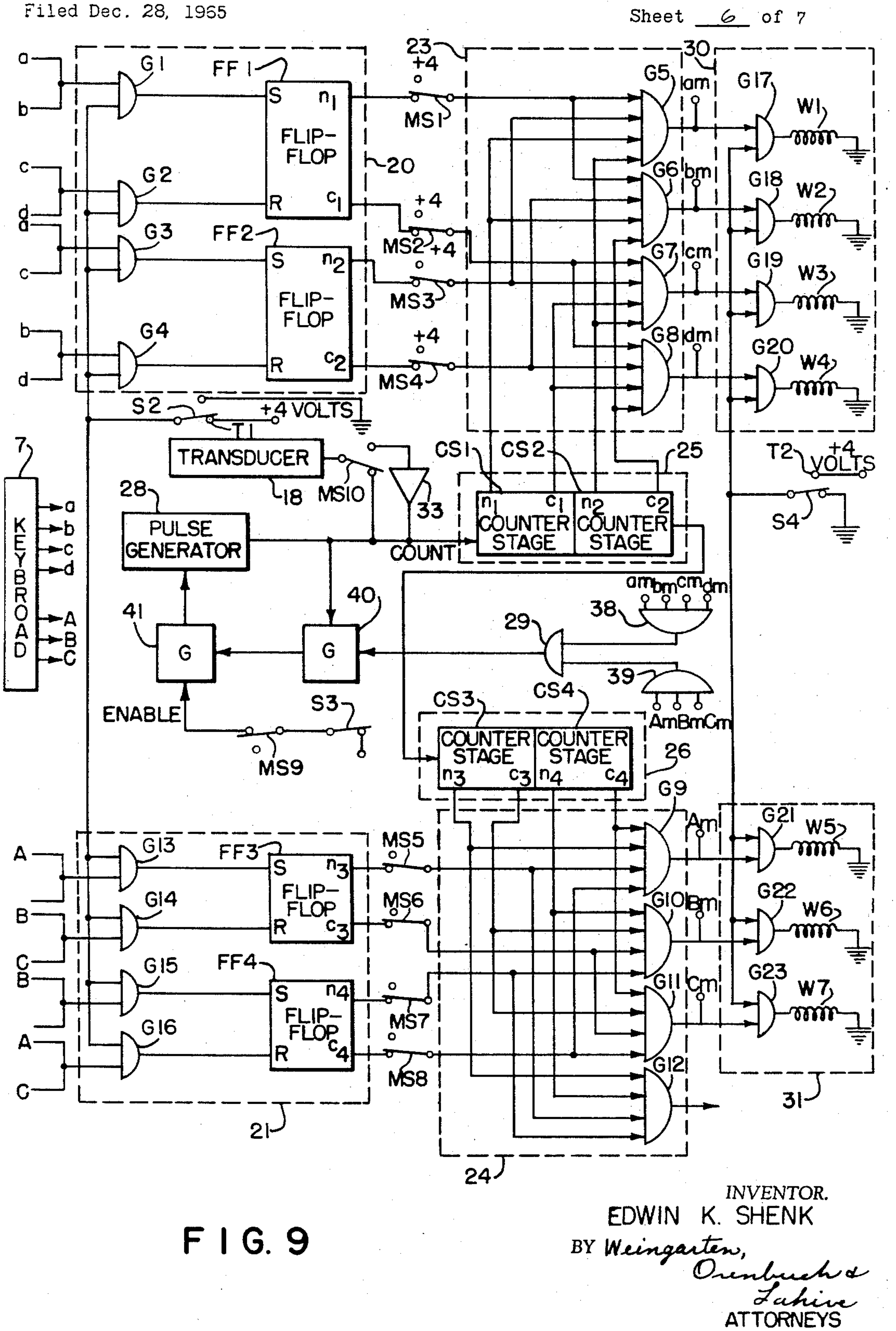
Figures 10, 11:
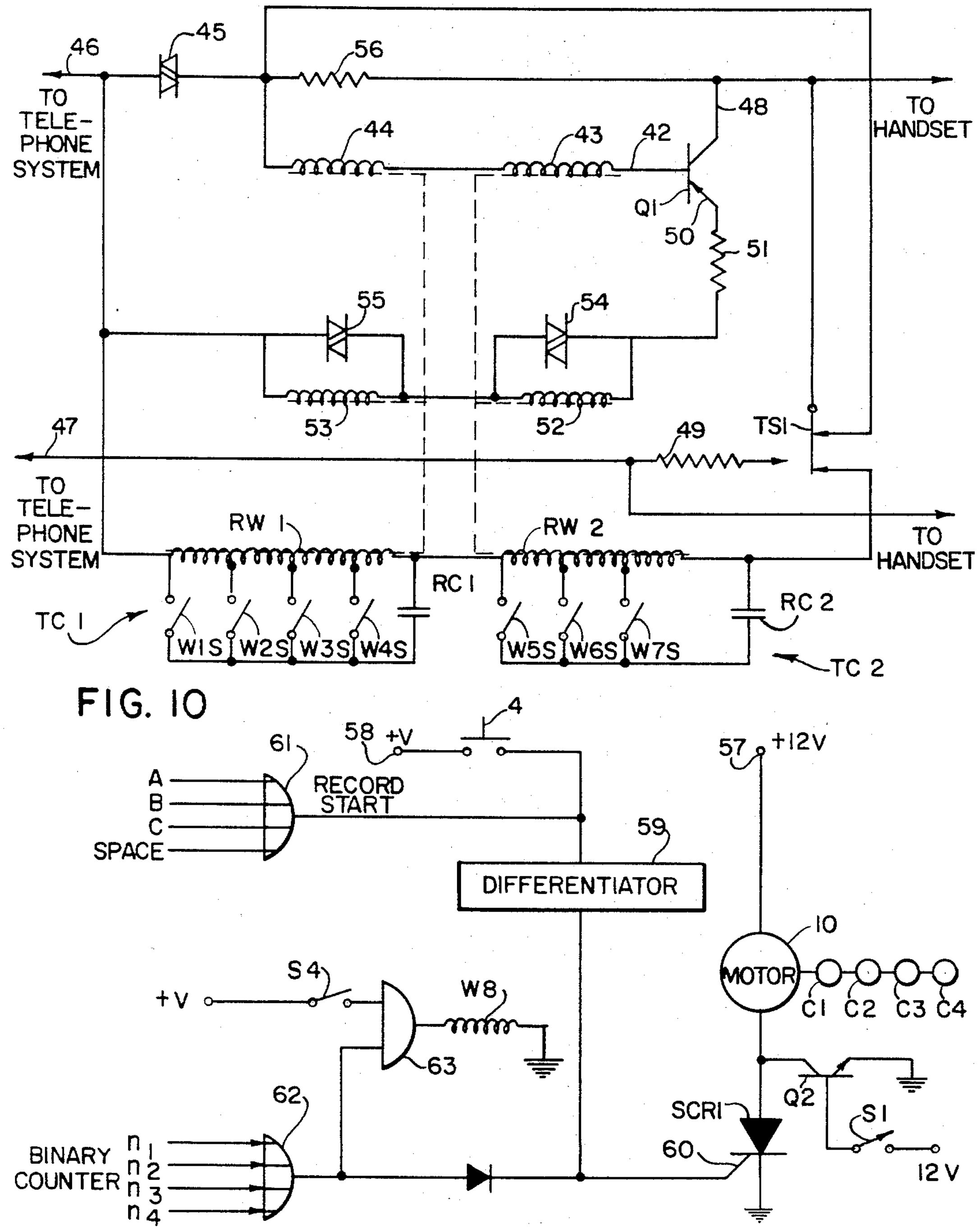

FIG. 4 tabulates the binary code and number of pulses with respect to the buttons in the keyboard;

FIG. 5 shows the scheme of the invention when the apparatus is in the mode where signals are recorded on the magnetic tape;

FIG. 6 is a timing diagram relating to the operation of the apparatus depicted in FIG. 5;

FIG. 7 shows the scheme of the invention when the apparatus is in the mode for automatically placing a telephone call upon actuation of the "call" button;

FIG. 8 is a timing diagram pertaining to the operation of the apparatus depicted in FIG. 7;

FIG. 9 diagrammatically depicts details of the invention whose scheme is shown in FIG. 5;

FIG. 10 illustrates a tone generator that is suitable for use in the invention; and FIG. 11 shows the details of the motor controller and sequencer.

Figure 1:
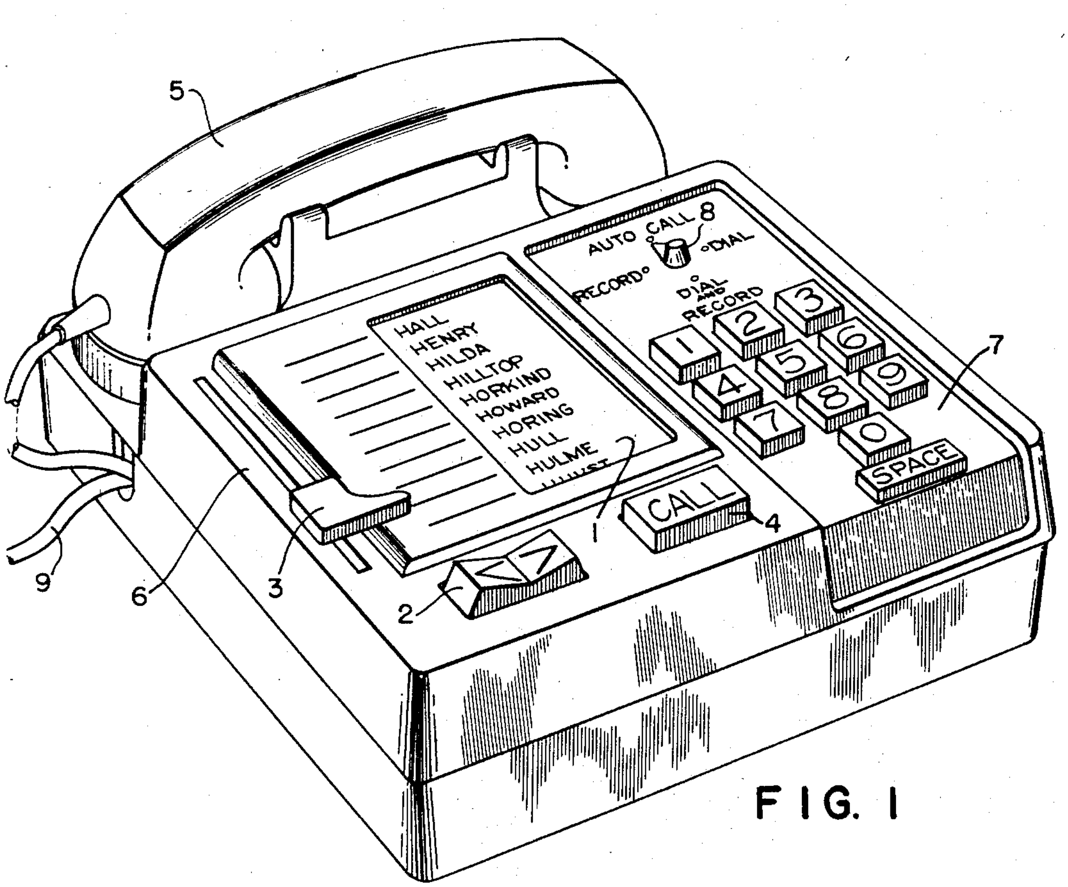
FIG. 1 illustrates the external arrangement of a preferred embodiment of the invention.

FIG. 1 depicts a repertory dialer having a magnetic tape 1 on which telephone numbers are magnetically recorded by a transducer located beneath the tape. The names of the subscribers are visible on the tape and a subscriber's name serves as an indication of the position on the tape of the subscriber's magnetically recorded telephone number. The names of the subscribers are arranged in groups in alphabetic sequence along the tape. To locate a desired number, the tape is moved longitudinally by depressing a tape position knob 2 until the correct alphabetic group is found and the transducer is then aligned with the recorded telephone number by moving the pointer 3 so that it is in line with the name of the subscriber. To automatically call the subscriber, a call button 4 is depressed, causing the magnetic tape to be moved past the transducer, whereupon the transducer reads the magnetically recorded information and causes the appropriate signals to be sent into the telephone system to obtain a connection with the selected subscriber's telephone. The repertory dialer has a handset 5 which is normally cradled upon housing 6. The housing contains a keyboard 7 having keys arranged in columns and rows. A four position switch knob 8 is provided upon the housing to permit the apparatus to be placed in one of four operating modes. When the switch is in the "auto call" position, a telephone call can be made to a selected subscriber's number by simply depressing call button 4. In the "dial" position, a telephone call is made in the customary manner by depressing the buttons on the keyboard corresponding to the telephone number of the called subscriber. If it is desired to place a telephone call to a subscriber and at the same time have that subscriber's telephone number recorded upon the magnetic tape so that subsequent calls can be made simply by depressing call button 4, switch 8 is placed in the "dial and record" position and the call is placed in the usual manner by depressing the keyboard buttons in the appropriate sequence and then depressing the "space" button. Where it is desired to record a telephone number on the magnetic tape without placing a call to the subscriber, the switch is placed in the "record" position and the buttons on the keyboard are depressed as though a call were actually being made and at the end the "space" button is depressed. The repertory dialer is connected to the telephone system by a conventional telephone line 9 that is connected to the mechanism in housing 6.

When recording information upon the magnetic tape or when information is read from that tape, the tape is moved past the transducer which is employed for both the read and write functions. As an alternative, the transducer can be moved past the tape since the principal requirement is that there be relative movement between the tape and the transducer in order to space the signals along the tape when they are being recorded and to produce the requisite rate of change of magnetic flux when the recorded signals are read. In patent application Ser. No. 500,918 entitled Data Indexing System, filed in the United States Patent Office on Oct. 22, 1965, invented by Manfred R. Kuehnle, there is shown a suitable drive mechanism for moving the magnetic tape past a read-write transducer head. That tape drive mechanism can be employed in the invention here disclosed to move the magnetic tape.

Figure 2:
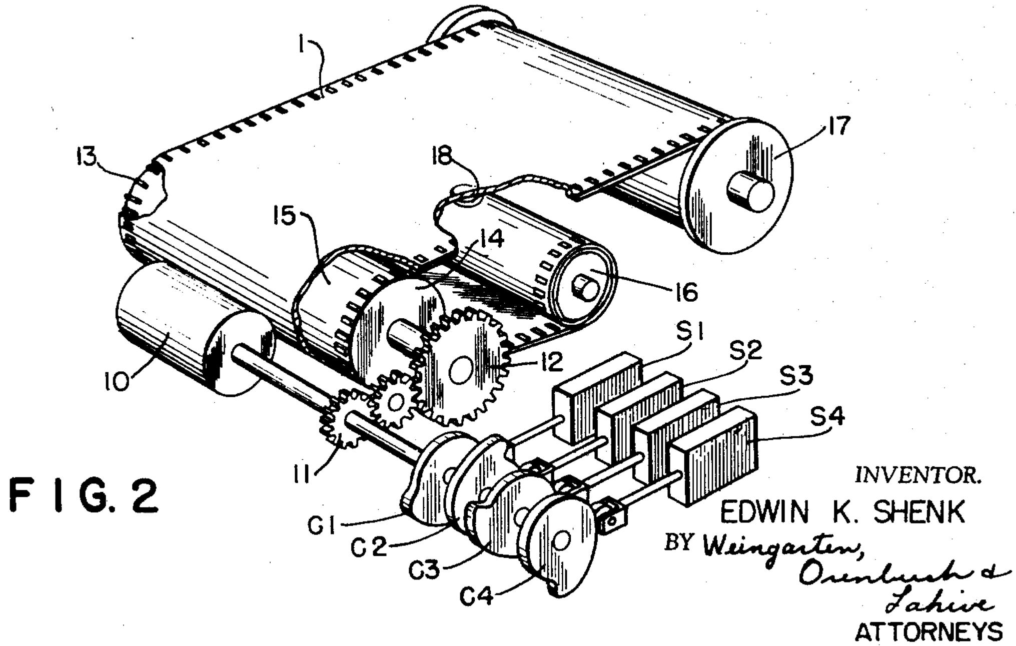
FIG. 2 depicts a magnetic tape of the kind employed in the invention and a simplified arrangement for driving that tape.

For purposes of exposition the tape drive mechanism is illustrated in FIG. 2 as utilizing an electric motor 10 having a pinion 11 driving, through speed reduction gearing, a gear 12 on a shaft having two sprockets 13 and 14 which engage perforations adjacent the edges of magnetic tape 1. The tape passes around shaft 15 and at one end the tape is wound upon a take up roll 16 while its other end is wound upon a take up roll 17. By energizing motor 10, the tape is caused to be moved past the transducer read-write head 18 located beneath the tape. Take up rolls 16 and 17 hold the tape taut regardless of the direction in which the tape is driven by the motor.

In FIG. 1, the keyboard 7 of the repertory dialer is depicted as having ten buttons arranged in columns and rows. The buttons or keys are marked with the ten decimal symbols 1, 2, 3 . . . 9, 0 employed in telephone numbers and may also be marked with alphabetical symbols. The arrangement of keys is shown, in a somewhat exaggerated form, in FIG. 3 where keys 1, 2, 3 are in row *a*; keys 4, 5, 6, are in row *b*; keys 7, 8, 9 are in row *c* and key 0 is in row *d*. Keys 1, 4, 7 form a column that is designated A; keys 2, 5, 8, 0 form a column that is designated B; and keys 3, 6, 9 form column C. Each horizontal row is identified by a two bit binary code and each vertical column is identified by a two bit binary code. Every key in the arrangement is, therefore, associated with a four bit binary code which is a composite of the row code and the column code. In the four bit binary code the first two bits identify the row and the second two bits identify the column.

The buttons and their associated binary codes are tabulated in FIG. 4 together with a column headed No. of Pulses. The No. of Pulses column sets forth the number of pulses that is recorded on the magnetic tape to identify the numeric value of a key. For example, the 1 key is associated with binary code 0111 and a train of seven pulses is recorded on the magnetic tape when that key is depressed and the apparatus is in the "record" mode. Similarly, the 2 key is identified by the binary code 1011 and a train of eleven pulses is recorded on the magnetic tape when that key is depressed. The 3 key is identified by the binary code 0011 and a train of three pulses is recorded on the magnetic tape when that key is depressed. From a study of the table in FIG. 4, it will be apparent to those familiar with binary coding that the number of pulses corresponds to the decimal value of its associated binary code. Thus, 0111 in the standard binary code is equivalent to 7 in the decimal system, 1011 in the standard binary code is equivalent to eleven in the decimal system, 0011 in the standard binary code is equivalent to 3 in the decimal system; and so on.

The keyboard is constructed to emit electrical signals which identify the row and column of any key that is depressed. Further, when any button of the keyboard is depressed, a signal is produced that starts the electric motor and causes the tape to be rapidly brought up to the appropriate speed for recording or reading magnetic signals FIG. 5 schematically depicts the invention when the apparatus is in the mode where signals are to be recorded on the magnetic tape. For purposes of exposition, the keyboard 7 is illustrated as having a section that emits a row signal and a section that emits a column signal. A keyboard of the type described in U.S. Patent No. 3,035,-211 may be employed, if desired, to generate the row and column signals. Upon the depression of a key, the 1 key for example, a row signal is transmitted from the keyboard to row memory 20, a column signal is transmitted from the keyboard to column memory 21, and a start signal is produced which is applied to the motor controller and sequencer 22 to cause electric motor 10 to be energized. For simplicity, the sequencer is shown in FIG. 2 to utilize a number of cams C1, C2, C3 and C4 to cause switches S1, S2, S3, and S4 to open and close in a sequence that is governed by the rotation of the shaft of motor 10. The sequencer is merely a timing device which generates electrical signals in a sequence related to the rotation of the shaft of electric motor 10 and the sequencer may readily take forms other than a series of cam controlled switches. Upon energization of the electric motor, the magnetic tape is driven past the record head 18 but cannot immediately be brought up to the speed needed for the recordation of magnetic pulse signals. Referring to the timing diagram of FIG. 6, the start signal is shown to exist at 0° of cam rotation and the energization of electric motor 10 commences immediately. Recording of signals on the magnetic tape does not occur until after the cams have rotated through at least 30°, at which time the magnetic tape has been brought up to the speed appropriate for recording.

Row memory 20 is a device which converts the electrical row signal from the keyboard to binary signals identifying the row of the actuated key and continuously emits those binary coded signals to row comparator 23. Similarly, column memory 21 is a device which converts the column signal from the keyboard to binary signals identifying the column in which the actuated key is located and the column memory continuously emits its binary coded signals to column comparator 24. In effect, row memory 20 and column memory 21 establish the binary code that characterizes the key in the keyboard which was actuated by being depressed. The first two bits of that characterizing code are stored in the row memory and the second two bits of the code are stored in the column memory.

Row code generator 25 and column code generator 26 form a four stage binary counter 27 of which the first two stages constitute generator 25 and the last two stages constitute generator 26. To insure that all information in the binary counter is removed, the sequencer 22 applies a CLEAR signal, indicated in the timing diagram of FIG. 6, to the four stages of the counter to cause all those stages to be cleared. After the counter has been cleared and after a delay, sequencer 22 emits a signal which starts pulse generator 28 into operation. The pulse generator is preferably an astable multivibrator, which upon being enabled by the sequencer signal, emits a train of pulses, as shown in the FIG. 6 timing diagram. The pulse generator continues to generate periodic pulses until the generator is disabled by a muting signal. The number of pulses in the train emitted from generator 28 depends, therefore, upon the time of occurrence of the disabling signal. In order to prevent the muting signal from disabling the pulse generator while a pulse is partially formed, a gating arrangement may be employed to insure that the muting signal can disable the generator only in the interval between pulses.

Each electrical pulse emitted from generator 28 is applied to write head 18 and that transducer causes magnetic pulse signals to be recorded upon the magnetic tape which is being driven past the head by the energized electric motor 10. The pulses from generator 28 are also applied to the input of binary counter 27. As each pulse enters the counter, the counter emits binary signals indicating the cummulative count. Thus, the pulses into the counter causes that device to emit the following binary coded signals:

| Pulse: | Binary signals |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |

The binary coded output signals constituting the first two bits of the counter's binary code are applied by the row code generator to row compaartor 23 and the binary coded output signals constituting the last two bits of the counter's code are applied by column code generator 26 to column comparator 24. When the coded output of row memory 20 is matched by the coded output of row code generator to row comparator 23 and the binary signal to muting gate 29. Similarly, when the coded output of column code generator 26 matches the coded signals emitted by column memory 21, column comparator 24 emits an enabling signal to muting gate 29. Where both inputs to the muting gate are simultaneously enabled, the muting gate emits a disabling signal which cuts off pulse generator 28. Upon being disabled, the pulse generator ceases to emit pulses and the counter remains in the state it was in when the last pulse from the generator was entered. At this time, the number of pulses recorded upon the magnetic tape corresponds to the number of pulses, tabulated in FIG. 4, associated with the button on the keyboard which was actuated. On the assumption that the 1 button was depressed, seven pulses are recorded upon the magnetic tape and the binary code in counter 27 is 0111. In this condition of the apparatus, row comparator 23 emits a signal to row frequency selector 30 which determines one of the two frequencies for tone generator 32 and column comparator 24 emits a signal to column frequency selector 31 that determines the other frequency for tone generator 32. Those two frequencies, in turn, determine the tone that is generated. The tone signal occurs, as shown in FIG. 6, during the time that tone generator 32 is enabled by a signal from sequencer 22. Where the repertory dialer is in the "dial and record"

mode of operation, the tone burst from the tone generator is transmitted into the telephone system. If the repertory dialer is in the "record" mode of operation, the tone burst is not permitted to pass into the telephone system. Shortly after the tone burst, cam switch S1 opens, as indicated in the FIG. 6 timing diagram, and causes the electric motor to be de-energized whereupon the tape ceases to be driven past the recording head and comes to a stop. Upon the actuation of a button on the keyboard, the foregoing sequence of operation is repeated and another train of pulses is recorded upon the magnetic tape. After the requisite number of keys have been actuated to completely record a subscriber's telephone number, the "space" button (FIG. 1) is depressed and causes the operation to be repeated without any pulses, however, being recorded. The "space" button insures that after each telephone number recorded on the tape there exists an area on the tape track that is clear of signals.

In essence, the button of the keyboard that is depressed causes an enabling time gate TG1 (FIG. 6) to be generated during which signals from pulse generator 28 are transmitted to the write head 18 and to binary counter 27. The number of pulses transmitted to the record head depends upon the duration of time gate TG1. Each button of the keyboard, when depressed, causes a time gate of a fixed duration to be generated which, in turn, causes a fixed number of pulses to be recorded on the tape. As each button of the keyboard is associated with a time gate whose duration is different from the duration of the time gate of any other button of the keyboard, the number of pulses that are recorded is different for each button. The number of pulses that are recorded or are transmitted to the binary counter, in turn, determine a tone of the alternating current signalling system. The signals from the keyboard, therefore, are first converted to a train of pulses and the pulse train then determines the tone that is transmitted into the telephone sysem.

After a subscriber's telephone number has been recorded upon the magnetic tape, a telephone call can automatically be made to that subscriber by placing the repertory dialer of FIG. 1 in the "auto call" mode, positioning the tape so that the selected subscriber's name appears in the window of the apparatus, aligning pointer 3 with the subscriber's name, and pressing "call" button 4. Actuation of "call" button 4, as indicated in FIG. 7, applies a start signal to the motor controller and sequencer 22 which causes motor 10 to be electrically energized. The timing diagram of FIG. 8 shows the sequence of events which occur as a result of the start signal. The order and time of occurrence of the events is governed by the sequencer which, as previously stated, is regulated by the rotation of the electric motor's shaft. Because the magnetic tape is driven by the electric motor, the time of occurrence of the events is, in effect, keyed to the position of the magnetic tape relative to the stationary read-write transducer head 18.

About 30° of cam rotation has been found adequate to bring the magnetic tape to the speed where reading can be performed adequately by read head 18. At this time cam switch S1 closes and applies a signal to OR gate 35 in FIG. 7 which maintains electric motor controller and sequencer 22 in operation. At nearly the same time that switch S1 closes, the sequencer emits a "clear" signal to the four stage counter 27 which clears that counter of any information that may have previously been entered and in effect sets that counter to zero. Code detector 34 is coupled to the four stages of counter 27 and the detector is arranged to emit a signal to OR gate 35 when there is any binary number, other than zero, in counter 27. The code detector emits a signal which maintains motor controller 22 in operation so long as a binary number other than zero is entered in the counter and ceases to emit that signal when the counter is empty of information, viz., when there is no count recorded in the counter.

After the counter has been cleared, the magnetic tape will normally have moved to bring the recorded pulses of the first digit in the telephone number adjacent read head 18. As the tape passes by the stationary read head, that transducer senses the recorded pulses and transmits electrical pulse signals, through amplifier 33, to binary counter 27. Each pulse causes the count in the counter to increase cumulatively. As the count in row code generator 27 (which comprises the first two stages of the binary counter) changes, the output of the row code generator causes row frequency selector 30 to select a different frequency. That is, for each different code emitted by generator 25 there exists a frequency which can be selected by the row frequency selector. For example, the binary code 11 emitted by the two stages of generator 25 causes selector 20 to choose frequency $f_a$ for tone generator 32, whereas if the binary code emitted those two stages is 01 frequency, $f_b$ is selected in the place in the first, and if the binary code is 10 or 00, a frequency $f_c$ or $f_d$ is selected.

Similarly for each different code emitted by column code generator 26 (which comprises the third and fourth stages of binary counter 27) there exists a frequency $f_A$, $f_B$, or $f_C$ which can be selected by column frequency selector 31. Where the binary code emitted by the two stages of generator 26 is 01, frequency $f_A$ is chosen for tone generator 32 by selector 31; where binary code 10 is emitted, frequency $f_B$ is selected; and where the binary code emitted by generator 25 is 00, selector 31 chooses frequency $f_C$ for the tone generator.

Assuming that after the clear signal (FIG. 8), head 18 reads seven pulses from the magnetic tape, binary counter 27 enters a total count that causes generator 25 to emit a 11 binary code to the row frequency selector and causes generator 26 to emit a 01 binary code to the column frequency selector. Selector 30, therefore chooses frequency $f_a$ and selector 31 chooses frequency $f_A$ and those selectors set tone generator 32 in condition to emit the tone constituted by frequencies $f_a$ and $f_A$ which identify the decimal 1 in the telephone number of the subscriber who is being called. Tone generator 32, however, cannot emit a tone signal until the generator is enabled by a signal from sequencer 22. The enable signal is emitted after a time that permits the maximum number of pulses (i.e. 11 pulses) to be read from the tape by read head 18 and entered in the binary counter. Since only seven pulses were, in this instance, read from the tape, a count of seven is entered in the binary counter at the time the sequencer emits its enabling signal to the tone generator. Upon being enabled, the tone generator emits a tone burst into the telephone system. After the tone burst, switch S1 opens and the motor controller would normally de-energize the electric motor, causing the tape movement to halt. Code detector 34, because of the count entered in binary counter 27, emits a signal to OR gate 35 which maintains the motor in operation and the tape continues, without interruption to move past the read head. The sequence of events is repeated and the next digit in the subscriber's telephone number, recorded as pulses on the magnetic tape, causes another tone burst to be delivered into the telephone system. The sequence of events is repeated until the last recorded digit is read as a train of pulses from the magnetic tap and a tone burst is transmitted into the telephone system.

Following the last digit in the telephone number recorded on the magnetic tape is an area that is devoid of pulse signals. The area in the tape's track that is devoid of signals resulted from the actuation of the "space" button (FIG. 1) on the keyboard as the last button that was depressed when the subscriber's telephone number was recorded. When, therefore, "clear" signal 36 (FIG. 8) clears the information of the last recorded digit from the binary counter, read head 18 fails to pick up any other pulses because the tape track passing the head is devoid of signals. Binary counter 27 consequently remains empty and code detector 34 ceases to emit an energizing signal to OR gate 35. When switch S1 opens, there is no energizing signal at the OR gate and the motor controller 22 de-energizes the electric motor, causing the tape to halt. The subscriber's telephone number is therefore automatically transmitted as a series of tone bursts into the telephone system and the tape stops when the recorded number is completely read.

Referring now to FIG. 9, the *a, b, c, d* outputs represent the row signals emitted by the keyboard upon depression of the buttons of the keyboard and the A, B, C, outputs represent the column signals emitted from the keyboard. The *a, b, c, d* row outputs are coupled to row memory 20 which utilizes four AND gates G1, G2, G3 and G4 to control the states of two flip-flops FF1 and FF2. Each of the four AND gates G1, G2, G3, G4 has one of its inputs governed by the switch S2 which is controlled by cam C2. Switch S2 is initially connected to a +4 volt supply at terminal T1 when the motor is de-energized and as soon as the motor begins to turn, the switch is connected to ground to thereby inhibit gates G1, G2, G3 and G4. AND gate G1 has its other input terminal coupled to the *a* and *b* outputs of the keyboard and the output of that gate is connected to the set(s) input of flip-flop FF1. The *c* and *d* outputs of the keyboard are connected to one input of gate G2 and the output of that gate is coupled to the reset (R) input of flip-flop FF1. The *a* and *c* outputs of the keyboard are applied to one input of gate G3, and the *b* and *d* outputs are coupled to one input of gate G4. The set input of FF2 is coupled to the output of gate G3, and the reset input of that flip-flop is connected to the output of gate G4. Assuming that the reset state of a flip-flop is represented by a binary ZERO and the set state is represented by a binary ONE, then the row signals *a, b, c, d* can be tabulated with respect to the binary states of the flip-flops as follows:

| Row signal | FF2 | FF1 |
|---|---|---|
| a | 1 | 1 |
| b | 0 | 1 |
| c | 1 | 0 |
| d | 0 | 0 |

The row signals cause flip-flops FF1 and FF2 to assume designated states when the *a, b, c,* or *d* signal emitted by the keyboard enable AND gates G1, G2, G3, or G4. Those AND gates can be enabled only when switch S2 is connected to terminal T1 as otherwise the grounding of switch S2 causes the gates to be inhibited. Where switch S2 is connected to terminal T1, AND gates G1, G2, G3, G4 are conditioned to emit a signal if the other input receives an *a, b, c,* or *d* signal from the keyboard.

Each of the flip-flops FF1 and FF2 provides two output signals, one of which is designated the "normal" output and the other of which is designated the "complementary" output. For convenience, the "normal" output of flip-flop FF1 is designated by $n_1$ and its complement is designated $c_1$; similarly, $n_2$ designates the "normal" output of FF2 and $c_2$ designates its complement. Each flip-flop is constructed to emit a ONE signal at one output when its other output emits a ZERO signal. That is, if in the set state, the normal output ($n$) of the flip-flop is a ONE, its complementary output ($c$) is a ZERO; when the flip-flop is reset, the normal output becomes a ZERO and the complement becomes ONE. In this exposition, a ONE is, by way of example, a positive potential of 4 volts, and a ZERO is represented by ground potential.

Initially flip-flops FF1 and FF2 may be in either of their stable states, but for ease of exposition, it is here assumed that both of the flip-flops are initially in the reset state. Assuming, further, that switch S2 is connected to terminal T1 and that the keyboard emits a row signal *b*, AND gate G1 emits a signal to the set input of FF1 and AND gate G4 emits a signal to the reset input of FF2. As flip-flop FF2 is already in the reset state, the signal from G4 does not affect the state of that flip-flop. The signal from gate G1, however, causes flip-flop FF1 to change from the reset state to the set state. The *b* signal from the keyboard also causes the motor 10 to be activated. As soon as the shaft of motor 10 commences to rotate, cam C2 causes switch S2 to be grounded, thereby disabling gates G1, G2, G3, and G4. By the time those gates are disabled, the flip-flops have responded to the row signal from the keyboard. After the gates are inhibited, the states of flip-flops FF1 and FF2 cannot be altered; in effect, the states of those flip-flops constitute a memory of the signal emitted by the keyboard.

The $n_1$ output of flip-flop FF1 is coupled to an input of AND gate G5 and an input of AND gate G6 whereas the $c_1$ output is connected to an input of AND gate G7 and an input of AND gate G8. Gates G5 and G7 each have an input connected to the $n_2$ output of FF2 while gates G6 and G8 each have an input connected to the $c_2$ output of that flip-flop.

AND gates G5, G6, G7 and G8 make up row comparator 23 and compare the output signals from flip-flops FF1 and FF2 with the output signals from row code generator 25. Generator 25 is constituted by the first two stages CS1 and CS2 of a four stage binary counter. The count input is applied to the first stage of the counter in the usual manner. Each stage of the binary counter is, as is customary, a bistable device having a "normal" and a "complementary" output. Further, each stage of the counter can be reset to zero count by applying to it a reset signal. For convenience, the "normal" output of the first counter stage CS1 is designated $n_1$ and its "complementary" output is designated $c_1$; similarly the "normal" output of the second counter stage CS2 is designated $n_2$ and its complement is designated $c_2$.

Each of the row comparator's AND gates, G5, G6, G7, G8, has four inputs, two of which are coupled to FF1 and FF2 and the other two of which are coupled to CS1 and CS2. The two inputs coupled to FF1 and FF2 correspond to the inputs that are coupled to CS1 and CS2 from the same AND gate. For example, gate G5 which has one input connected to the $n_1$ output of flip-flop FF1 and another input connected to the $n_2$ output of flip-flop FF2 also has an input coupled to the $n_1$ output of counter stage CS1 and another input coupled to the $n_2$ output of counter stage CS2. As another example, consider gate G7 which has one input connected to the $c_1$ output of FF1 and another input connected to the $n_2$ output of FF2, and has its other two inputs coupled to the $c_1$ output of counter stage CS1 and the $n_2$ output of counter stage CS2. Where all four inputs of a comparator AND gate are simultaneously energized by ONE signals, that AND gate emits a ONE signal; otherwise, the AND gate emits a ZERO signal. Where, therefore, stages CS1 and CS2 of generator 25 are in the states corresponding to the states of flip-flops FF1 and FF2, one of the comparator's AND gates has ONE signals applied to all its inputs and emits an enabling signal. In essence, AND gates G5, G6, G7, and G8 compare the signals from counter stages CS1 and CS2 against the signals from flip-flops FF1 and FF2 and that AND gate is enabled at which a match occurs.

Column comparator 24 is comprised by AND gates G9, G10, G11, and G12 arranged in relation to flip-flops FF3 and FF4 and binary counter stages CS3 and CS4 in a manner similar to the arrangement described above for the AND gates of the row comparator. AND gate 12 is not used and may therefore be omitted in the actual apparatus. It is here illustrated only to show the similarity in arrangement of the row and column comparators with regard to their respective "memories" and "code generators." The states of flip-flops FF3 and FF4 in the column memory are controlled by the signals emitted by AND gates G13, G14, G15, and G16.

The A, B, C column signals emitted by the keyboard are, as indicated in FIG. 9, applied to the inputs of AND gates G13, G14, G15, and G16. Each one of those gates has one of its inputs governed by switch S2 and those AND gates can be enabled only when switch S2 is connected to terminal T1. Where switch S2 is connected to terminal T1, AND gates G13, G14, G15 and G16 are conditioned to emit a signal if the other input receives an A, B, or C signal from the keyboard; where switch S2 is grounded, those gates are inhibited and the states of flip-flops FF3 and FF4 cannot then be altered. The states of counter stages CS1, CS2, CS3, and CS4 depend upon the number of pulses impressed upon the count input of the counter by pulse generator 28 or by the amplified output of transducer 18. Each pulse causes the counter to increase its count by one in the binary system. If therefore the four counter stages CS1, CS2, CS3, CS4 are initially in their ZERO state, the count progresses as follows:

| Pulse | CS4 | CS3 | CS2 | CS1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |

At some count, one of the AND gates in the row comparator and one of the AND gates in the column comparator are simultaneously enabled. The row comparator thereupon emits a muting signal $a_m$, $b_m$, $c_m$, or $d_m$ to OR gate 38, depending upon whether gate G5, G6, G7, or G8 is the gate that is enabled. Similarly, the column comparator simultanously emits to OR gate 39 a muting signal $A_m$, $B_m$, or $C_m$, depending upon which one of gates G9, G10 or G11 is enabled. The simultaneous transmission from OR gates 38 and 39 to muting gate 29 of a signal $a_m$, $b_m$, $c_m$ or $d_m$ and a signal $A_m$, $B_m$, or $C_m$, causes the muting gate to emit a signal to gate 40. The muting signal is able to pass through gate 40 only during the interval between the pulses from pulse generator 28. If gate 29 is enabled while an incomplete pulse is being emitted from generator 28, gate 40 blocks the signal from the muting gate until the pulse is complete. The muting signal which passes through gate 40 disables gate 41 and thereby blocks the enabling signal from switch S3. Upon blockage of the enabling signal, pulse generator 28 immediately ceases to generate pulses and the counter thereafter does not alter its count until it is reset.

The output of each AND gate, G5, G6, G7, and G8 in the row comparator is coupled to a different one of AND gates G17, G18, G19, and G20 in row frequency selector 30. Thus, when gate G5 emits muting signal $a_m$, that gate also enables one input of AND gate G17; when gate G6 emits muting signal $b_m$, the gate also enables one input of AND gate G18; when gate G7 emits muting signal $c_m$, an input of AND gate G19 is enabled; and when gate G8 emits muting signal $d_m$, an input of AND gate G20 is enabled. The gates G9, G10, and G11 of the column comparator are similarly related to the AND gates G21, G22, and G23 in column frequency selector 31. Each of the gates in row frequency selector 30 and column frequency selector 31 has its other input connected to switch S4. All the gates in selectors 30 and 31 are, therefore, inhibited while switch S4 is grounded and are conditioned to be enabled when switch S4 is connected to the +4 volt potential at terminal T2. After a length of time sufficient to insure that 11 pulses can be read by magnetic head 18 into binary counter 27 and allowing an interval for the counter to settle, switch S4 transfers to terminal T2, whereupon one of AND gates G17, G18, G19 or G20 is enabled by the signal emitted from row comparator 23 and one of the gates G21, G22, or G23 is enabled by the signal emitted from column comparator 24.

Each AND gate in row frequency selector 30 and each AND gate in column frequency selector 31 has a relay winding connected to its output. If, for example, gate G17 in the row frequency selector is enabled when switch S4 transfers to terminal T2, winding W1 is energized by the output signal. Where the gate in the row frequency selector that is enabled when switch S4 transfers to T2 is, instead, gate G18, G19, or G20, then winding W2, W3, or W4, respectively, is energized. In the column frequency selector, gate G21 controls the energization of winding W5, gate G22 controls the energization of winding W6, and gate G23 controls the energization of winding W7. The gate in the row frequency selector and the gate in the column frequency selector that are enabled upon the transfer of switch S4 to terminal T2 determine the tone generated by dual frequency tone generator 32.

A dual frequency tone generator that is suitable for use in the repertory dialer is described in U.S. Patent No. 3,184,554. The scheme of that tone generator is shown here in FIG. 10 and employs a pair of tank circuits TC1 and TC2 arranged to store energy and to release that energy in an oscillatory discharge. The resonant circuit TC1 employs a winding RW1 and a capacitor RC1 which can be placed across the entire winding or across part of the winding by switches W1S, W2S, W3S, and W4S. Those switches are controlled by the windings W1, W2, W3, and W4 in the row frequency selector. Similarly, the windings W5, W6, and W7 in the column frequency selector control switches W5S, W6S, and W7S which can place capacitor RC2 in resonant circuit TC2 across all or part of winding RW2. Tank circuit TC1 has four selectable resonant frequencies and tank circuit TC2 has three selectable resonant frequencies. Tank circuits TC1 and TC2 are coupled, as indicated by the broken lines, to the feedback path of a transistor amplifier so that the oscillatory discharge of the tank circuits are sustained by the transistor circuit at the frequencies selected by row frequency selector 30 and column frequency selector 31.

The transistor amplifier utilizes a transistor Q1 having its base electrode 42 connected through serial windings 43 and 44 and diode 45 to one side 46 of the telephone line. The collector 48 of the transistor is connected by transfer switch TS1, when that switch has transferred to the left, and by resistor 49 to the other side 47 of the telephone line. The transistor's emitter 50 is connected through resistor 51 and series windings 52 and 53 to side 46 of the telephone line. Winding 52 is shunted by a diode 54 and winding 53 is shunted by a diode 55; the diodes act to regulate the amplitudes of the voltages across those windings. Diodes 45, 54, and 55 are preferably each a pair of oppositely poled, parallel connected varistors (Western Electric type 420B or equivalent) which exhibit a high resistance up to 0.7 volt peak amplitude, above which the resistance falls rapidly. Resistor 56 is connected to diode 45 and serves to pass current to that diode to establish its nominal conducting voltage and to form a load in parallel with the line to reduce the variation of signal output voltage with line impedance.

Energy derived from the voltage developed across diode 45 is stored in tank circuit TC1 and tank circuit TC2 during the time that the transfer switch TS1 is in the position illustrated in FIG. 10 and the lines 46 and 47 are connected to the telephone system. Upon the transfer of switch TS1 to the left, the voltage from source 45 is interrupted so that the resonant circuits TC1 and TC2 are shocked into oscillation. Damped oscillations are thereby induced in each of the resonant circuits. Dual oscillation of the transistor amplifier ensues because the amplifier is operated as a linear device capable of supplying energy to the two tuned circuits as well as to the output load which comprises the telephone line 46, 47 and resistor 56. Selection of the correct tap on each winding RW1 and RW2 is made by enabling one relay winding W1, W2, W3 or W4 in row frequency selector 30 and one relay winding, W5, W6, or W7 in column frequency selector 31. In order to shock excite resonant circuits TC1 and TC2 into oscillation, transfer switch TS1 must be actuated to cause it to transfer to the left. The transfer switch is normally in the position shown in FIG. 10. When it is desired to generate a tone, the transfer switch is actuated by causing a current to flow in the relay winding W8 shown in FIG. 11.

FIG. 11, in essence, shows that part of the repertory dialer system designated "motor controller and sequencer" in FIGS. 5 and 7. In FIG. 11 the motor 10 is indicated to be mechanically connected to the cams C1, C2, C3, and C4 which control the actuation of switches S1, S2, S3, and S4, respectively. The motor is connected to a source of electrical power applied at terminal 57 and the electrical circuit for the motor is completed to ground either through a silicon controlled rectifier SCR1 or a transistor Q2 which effectively shunts SCR1 when switch S1 is closed. When switch S1 is open, however, transistor Q2 presents a high impedance to ground.

In the "auto call" mode of operation, call button 4 is depressed to make a telephone call. Actuation of button 4 causes a positive voltage wave from terminal 58 to be applied to differentiator 59. The differentiated leading edge of the wave, impressed upon the control electrode 60 of SCR1, causes that rectifier to "fire," that is, to become electrically conductive. Upon the firing of SCR1, the electrical circuit through the motor becomes complete and the motor's armature commences to turn.

In those modes of operation where the keyboard is used, operation of the electric motor is commenced by depressing one of the keyboard's buttons. The A, B, or C column signal emitted from the keyboard, or the signal emitted when the "space" button is actuated, is applied to OR gate 61 in FIG. 11 and that gate emits a positive voltage wave to differentiator 59. The differentiated signal from the differentiator is impressed upon the control electrode 60 of SCR1 and causes that rectifier to be placed in the condition in which it is electrically conductive.

After SCR1 has fired, the rectifier remains in its electrically conductive state so long as its anode is sufficiently positive, even when the positive starting signal is removed from its control electrode. When the cam shaft of motor 10 has turned about 30°, switch S1 closes, causing transistor Q2 to present a very low impedance to ground and thereby remove the positive potential from the anode of SCR1. The rectifier SCR1 becomes non-conductive, but the motor's circuit is not interrupted because a path to ground through Q2 is substituted for that through the rectifier. When switch S1 opens, after the motor cam shaft has turned nearly 180°, the path to ground through Q2 is, in effect, broken, and, if SCR1 is not in condition to become conductive, the motor comes to a stop. SCR1 is in condition to become conductive if OR gate 62 supplies a positive signal to control electrode 60 when switch S1 opens. OR gate 62 has four inputs, each of which is connected to one of the stages in the binary counter 27 Hence where the $n_1$ output of CS1, and $n_2$ output of CS2, the $n_3$ output of CS3, or the $n_4$ output of CS4 is a binary ONE) indicating that information remains in the counter), OR gate 62 emits a positive signal which persists so long as a count, other than zero, is entered in the binary counter. The positive signal from OR gate 62, if present upon the control electrode 60 when switch S1 opens, causes SCR1 to immediately fire and motor 10, thereupon, continues to be electrically energized.

The positive signal emitted from OR gate 62 is also impressed upon an input of AND gate 63 in whose output relay winding W8 is connected. When motor 10 has turned its cam shaft about 145°, switch S4 closes and applies an enabling signal to the other input of AND gate 63. With both inputs enabled, AND gate 63 energizes the relay winding W8, thereby actuating transfer switch TS1 (FIG. 10) and causing a tone to be generated.

Turning again to FIG. 9, the mode switches MS1, MS2 . . . MS9 are in positions depicted when the repertory dialer is in any of the modes where the keyboard 7 is employed; that is, the "dial," "dial and record," or "record" mode. In the "auto call" mode, the switches MS1, MS2 . . . MS9 are in their other positions whereby pulse generator 28 is effectively disabled by the disconnection of the signal from S3, transducer 18 is connected through amplifier 33 to the input of binary counter 27, and the inputs to gates G5, G6 . . . G11, G12 which usually are connected to flip-flops FF1, FF2, FF3, and FF4 are now all enabled by the +4 volt positive potentials at mode switches MS1 to MS7, inclusive. In the "auto call" mode, therefore, keyboard 7, row memory 20 and column memory 21 are not employed and row comparator 23 and column comparator 24 lose their comparison functions and merely become signal conduits to frequency selectors 30 and 31. In FIG. 7 which indicates the scheme of the apparatus in the "auto call" mode, the keyboard, the row and column memories, and the comparators are omitted to signify the absence of their functions in that mode.

As the invention can be embodied in a multitude of differing structures, it is not intended that the scope of the invention be restricted to the precise embodiment illustrated in the drawings. Rather, it is intended that the scope of the invention be delimited by the appended claims and to include such structures as do not in essence fairly depart from the invention there defined.

What is claimed is:

1. A repertory dialer in which signals representative of numbers are recorded at equally spaced intervals along a track in a magnetic recorder when a keyboard is repetitively operated to select the desired digits, the dialer comprising:

(1) a magnetic recorder including a transducer and a record medium;

(2) first encoding means, responsive to operation of each key in the keyboard, for producing a parallel binary number indicative of the particular key operated and for producing a control signal;

(3) means, responsive to the occurrence of the control signal, for moving the transducer and the record medium relative one to the other for a predetermined distance, such means including an electric motor energized by the control signal for one cycle of operation;

(4) pulse forming means for producing a train of pulses after the electric motor is energized, each successive pulse in such train being applied to the transducer;

(5) second encoding means, also actuated by each pulse in the train thereof, for successively producing, during the first portion of each cycle of operation of the electric motor, different parallel binary numbers indicative of the total number of pulses out of the pulse forming means;

(6) comparator means for producing a signal when the parallel binary number in the second encoding means is identical with the parallel binary number in the first encoding means; and, (7) means, responsive to the occurrence of the signal out of the comparator means, for inhibiting later occurring pulses in the train of pulses to the transducer and the second encoder so that the number of pulses recorded are indicative of the parallel binary number in the first encoding means and of the particular key operated.

2. A repertory dialer as in claim 1 having, in addition, (1) a plurality of oscillators connected to a telephone line, each producing when energized, a signal having a different frequency;

(2) switching means to connect the transducer to the second encoding means in place of the pulse forming means;

(3) manually operable means for energizing the electric motor for one cycle of operation;

(4) decoding means, actuated in response to the binary number in the second encoding means, for enabling different ones of the plurality of oscillators to be energized;

(5) gating means, actuated during the latter portion of the cycle of operation of the electric motor, for energizing the then enabled ones of the plurality of oscillators;

(6) means, responsive to the presence of a parallel binary number in the second encoding means, for repetitively energizing the electric motor at the end of each cycle of its operation to repeat the foregoing until the entire recorded signal has been read out of the recorder to produce bursts of signals from the plurality of oscillators representative of the digits of a selected telephone number.

3. A repertory dialer for generating tone signals comprising:

(1) a magnetic medium;

(2) a transducer for recording signals upon the magnetic medium;

(3) a pulse generator;

(4) a keyboard having keys corresponding to the tone signals to be generated;

(5) means responsive to signals from the keyboard for producing a time gate during which signals from the pulse generator are applied to the transducer for recordation upon the magnetic medium, each key causing a time gate to be produced whose duration is different from the time gate produced by the keys associated with other tones;

(6) and means responsive to the number of pulses occurring during the time gate for selecting a tone signal whereby a different tone signal is selected for each different number of pulses.

4. A repertory dialer according to claim 3 in which the magnetic medium is a tape, the repertory dialer further including means for causing relative motion to occur between the tape and the transducer at least during the time that signals are being recorded upon the tape.

5. A repertory dialer according to claim 3 further including means for aligning the transducer with a track on the tape and means for causing a length of the track to be clear of signals after each recorded telephone number.

6. A repertory dialer according to claim 3 in which the means for producing a time gate include (a) a memory device for converting signals from the keyboard to binary coded signals;

(b) a code generator for converting signals from the pulse generator to binary coded signals;

(c) means for comparing the binary coded signals from the memory device with the binary coded signals from the code generator to determine when a match has occurred; and (d) means for terminating the pulses emitted from the pulse generator upon the occurrence of a match.

7. A repertory dialer according to claim 3 in which the keys of the keyboard are arranged in rows and columns, and in which the means for producing a time gate include (a) a row memory for converting signals from the keyboard to binary coded signals;

(b) a column memory for converting signals from the keyboard to binary coded signals;

(c) a code generator for converting signals from the pulse generator to binary coded signals;

(d) a row comparator for comparing the binary coded signals from the row memory with binary coded signals from the code generator, the row comparator emitting a muting signal when a match occurs;

(e) a column comparator for comparing the binary coded signals from the column memory with binary coded signals from the code generator, the column comparator emitting a muting signal when a match occurs; and (f) means for applying a disabling signal to terminate operation of the pulse generator upon the simultaneous emission of muting signals from the row and column comparators.

8. A repertory dialer according to claim 7 in which the means for producing a time gate further includes (g) means for supplying an enabling signal to the pulse generator to cause that generator to operate; and (h) means for preventing disabling of the pulse generator except during the intervals between emitted pulses.

9. A repertory dialer according to claim 8 in which the means for selecting a tone signal includes (a) a row frequency selector responsive to the muting signal from the row comparator for determining one frequency of the two frequencies constituting the tone;

(b) a column frequency selector responsive to the muting signal from the column comparator for determining the other frequency of the tone.

10. A repertory dialer according to claim 9 further including (c) a dual frequency tone generator whose frequencies are determined by the row frequency selector and the column frequency selector, and (d) means for enabling the tone generator to produce a tone after an interval sufficient to record upon the tape all the pulses occurring during the time gate.

References Cited

UNITED STATES PATENTS 3,341,666 9/1967 Wallace.
3,387,098 6/1968 Fischer.

KATHLEEN H. CLAFFY, *Primary Examiner.*

A. H. GESS, *Assistant Examiner.*